(12) United States Patent
Koustubhan et al.

(10) Patent No.: US 12,116,135 B2
(45) Date of Patent: Oct. 15, 2024

(54) SELF SUPPORTING BERTHING PLATFORM SYSTEM FOR AIRCRAFT SEATS

(71) Applicant: B/E Aerospace, Inc., Winston-Salem, NC (US)

(72) Inventors: Arjun Koustubhan, Hyderabad (IN); Michael L. Oleson, Parkland, FL (US); Raghavendra Kottem, Telangana (IN)

(73) Assignee: B/E Aerospace, Inc., Winston-Salem, NC (US)

( * ) Notice: Subject to any disclaimer, the term of this patent is extended or adjusted under 35 U.S.C. 154(b) by 54 days.

(21) Appl. No.: 18/072,140

(22) Filed: Nov. 30, 2022

(65) Prior Publication Data

US 2024/0017834 A1    Jan. 18, 2024

(30) Foreign Application Priority Data

Jul. 12, 2022 (IN) .............................. 202241039909

(51) Int. Cl.
*B64D 11/06* (2006.01)

(52) U.S. Cl.
CPC ................ *B64D 11/0641* (2014.12)

(58) Field of Classification Search
CPC ... A47C 17/16; A47C 17/161; A47C 17/1655; A47C 17/20; A47C 17/80; A47C 19/205; B64D 11/0641; B64D 2011/0069; B64D 11/064; B64D 11/0639
See application file for complete search history.

(56) References Cited

U.S. PATENT DOCUMENTS

| | | | | |
|---|---|---|---|---|
| 2,730,164 A | * | 1/1956 | Higley | B61D 33/005 297/321 |
| 4,103,373 A | * | 8/1978 | Luedtke | A47C 17/50 5/147 |
| 4,343,508 A | * | 8/1982 | Heling | A47C 17/161 5/55.1 |
| 4,628,551 A | * | 12/1986 | Atimichuk | A47C 17/161 297/114 |
| 5,358,306 A | * | 10/1994 | Christensen | A47C 19/205 297/62 |

(Continued)

OTHER PUBLICATIONS

Extended European Search Report dated Oct. 26, 2023; European Application No. 23184000.0.

*Primary Examiner* — Philip J Bonzell
*Assistant Examiner* — Michael B. Kreiner
(74) *Attorney, Agent, or Firm* — Suiter Swantz IP

(57) ABSTRACT

A self-supporting berthing platform system is disclosed. The system may include a plurality of articulated panels including a first panel coupled to a second panel via at least one hinge assembly. The plurality of articulated panels may be configured to pivot between at least one of an upright position and a berth position. The system may include a hinge reinforcement assembly including a first reinforcement member and a second reinforcement member. The hinge reinforcement assembly may further include a flange. The system may include a panel reinforcement assembly including a first panel reinforcement member coupled to the first panel and a portion of at least one seatback frame and a second panel reinforcement member sub-assembly coupled to the second panel. The second panel reinforcement member sub-assembly may include at least one panel leg and at least one support block.

9 Claims, 18 Drawing Sheets

(56) References Cited

U.S. PATENT DOCUMENTS

| | | | | |
|---|---|---|---|---|
| 5,447,359 A * | 9/1995 | Asbjornsen | B64D 11/0641 | 297/423.26 |
| 5,601,348 A * | 2/1997 | Minkovski | A47C 17/52 | 312/238 |
| 5,740,989 A * | 4/1998 | Daines | B64D 11/0641 | 297/65 |
| 6,779,208 B2 | 8/2004 | Lim | A47C 17/48 | 5/2.1 |
| 7,070,149 B2 * | 7/2006 | McDonnell | B64D 11/00153 | 244/118.5 |
| 7,108,226 B2 * | 9/2006 | Quan | B64D 11/0606 | 244/118.6 |
| 7,159,937 B2 * | 1/2007 | Williamson | B60N 2/01508 | 297/216.13 |
| 7,182,404 B2 * | 2/2007 | Laurent | B64D 11/0641 | 297/411.39 |
| 7,427,106 B2 * | 9/2008 | Williamson | A47C 17/22 | 5/118 |
| 7,549,182 B2 * | 6/2009 | Murphy | A47C 17/20 | 5/42 |
| 7,837,262 B2 * | 11/2010 | Merensky | B61D 31/00 | 5/118 |
| 8,201,876 B2 * | 6/2012 | Dowty | B64D 11/064 | 297/86 |
| 8,226,163 B1 | 7/2012 | Pearson et al. | | |
| 8,303,036 B2 * | 11/2012 | Hankinson | B64D 11/064 | 297/340 |
| 8,403,415 B2 * | 3/2013 | Lawson | B64D 11/064 | 297/354.13 |
| 8,579,375 B2 * | 11/2013 | Marais | B60N 2/02 | 297/341 |
| 8,783,771 B2 * | 7/2014 | Oleson | B64D 11/0641 | 297/318 |
| 9,033,413 B2 * | 5/2015 | Round | B64D 11/06 | 297/232 |
| 9,120,574 B2 * | 9/2015 | Ligonniere | B64D 11/0641 | |
| 9,284,055 B2 * | 3/2016 | Beroth | B64D 11/0641 | |
| 9,446,849 B1 * | 9/2016 | Pinkal | B60N 2/3015 | |
| 9,468,303 B2 * | 10/2016 | Garland | A47C 17/1756 | |
| 9,545,999 B2 * | 1/2017 | Henshaw | B64D 11/0641 | |
| 9,604,724 B2 * | 3/2017 | Savard | B60N 2/62 | |
| 9,849,989 B2 * | 12/2017 | Ozaki | B60N 2/3011 | |
| 10,065,535 B1 | 9/2018 | Line et al. | | |
| 10,065,711 B2 * | 9/2018 | Fuller, IV | B60N 2/309 | |
| 10,427,793 B2 * | 10/2019 | Oleson | B64D 11/0621 | |
| 10,689,120 B2 * | 6/2020 | Phi | B64D 11/0639 | |
| 11,040,776 B2 * | 6/2021 | Erhel | B60N 2/34 | |
| 11,059,589 B2 * | 7/2021 | Oleson | B64D 11/0601 | |
| 11,419,427 B2 * | 8/2022 | Niemela | F16B 12/28 | |
| 11,673,672 B2 * | 6/2023 | Simpson | B60N 2/995 | 244/118.6 |
| 2002/0167207 A1 | 11/2002 | Larson | | |
| 2016/0090181 A1 | 3/2016 | Breuer | | |
| 2019/0127070 A1 | 5/2019 | Oleson et al. | | |
| 2020/0385126 A1 | 12/2020 | Ward | | |
| 2021/0276719 A1 | 9/2021 | Erhel | | |

\* cited by examiner

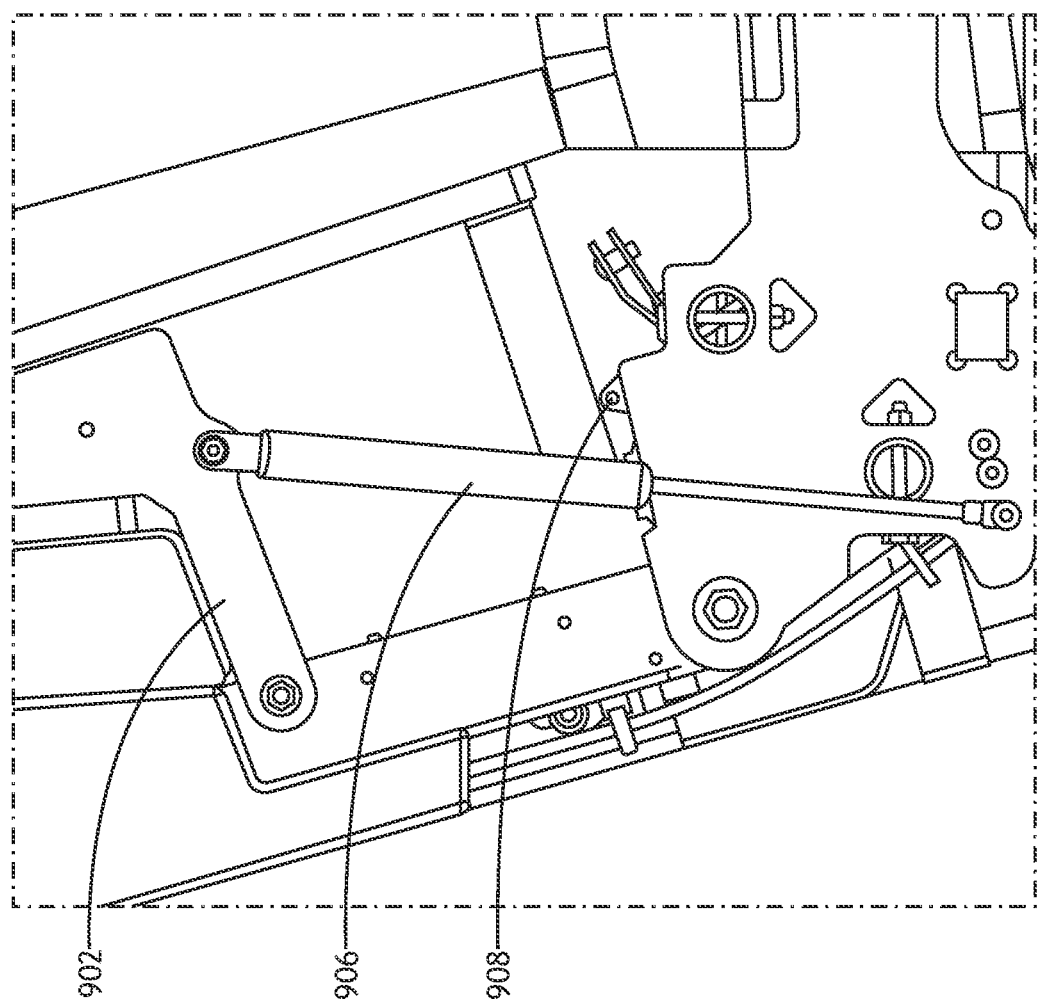

SELF SUPPORTING BERTHING PLATFORM SYSTEM FOR AIRCRAFT SEATS

CROSS-REFERENCE TO RELATED APPLICATIONS

The present application claims the benefit of India Provisional Application No. 202241039909, entitled SELF SUPPORTING BERTHING PLATFORM FOR AIRCRAFT SEATS, filed on Jul. 12, 2022, which is incorporated by reference in the entirety.

BACKGROUND

The build of the seat (and any included components within the build) may be required to meet guidelines and/or standards. For example, in select industries, the seat must be able to withstand load requirements, as set forth by the industry guidelines and/or standards.

SUMMARY

An aircraft seat is disclosed, in accordance with one or more embodiments of the present disclosure. The aircraft seat includes an aircraft seat frame including one or more seatback frames and a seat pan frame. The aircraft seat includes a self-supporting berthing platform system. The self-supporting berthing platform system includes a plurality of articulated panels, the plurality of articulated panels including a first panel coupled to a second panel via at least one hinge assembly, the plurality of articulated panels configured to pivot between at least one of an upright position and a berth position via an articulated mechanism. The self-supporting berthing platform system includes a hinge reinforcement assembly, the hinge reinforcement assembly including a first reinforcement member coupled to a portion of the first panel, the hinge reinforcement assembly further including a second reinforcement member coupled to a portion of the second panel, the hinge reinforcement assembly further including a flange coupled to an additional portion of the second panel, a portion of the first reinforcement member configured to overlap with a portion of the second reinforcement member. The self-supporting berthing platform system includes a panel reinforcement assembly. The panel reinforcement assembly includes a first panel reinforcement member coupled to a portion of the first panel and a portion of at least one of the one or more seatback frames. The panel reinforcement assembly includes a second panel reinforcement member sub-assembly coupled to a portion of the second panel, the second panel reinforcement member sub-assembly including at least one panel leg and at least one support block.

In some embodiments, the at least one hinge assembly may include a first leaf coupled to a portion of the first panel and a second leaf coupled to a portion of the second panel, the first leaf configured to mate with the second leaf.

In some embodiments, the flange may be coupled to a bottom surface of the second leaf and the second hinge reinforcement member is coupled to a top surface of the second leaf.

In some embodiments, the self-supporting berthing platform system may further include a panel frame sub-assembly including one or more framing members coupled to one or more edges of at least one the first panel or the second panel of the plurality of articulated panels.

In some embodiments, the at least one panel leg may include a fixed panel leg.

In some embodiments, the at least one support block may include a rotatable support block configured to rotate via a rotation sub-assembly In some embodiments, the rotation sub-assembly may include a ball plunger and a locking plate, the ball plunger configured to engage with one or more portions of the locking plate to secure the rotatable support block in at least one of a stowed position or a deployed position.

In some embodiments, the at least one panel leg may include at least one pivotable panel leg.

In some embodiments, the rotation sub-assembly may include a ball plunger and a locking plate, the ball plunger configured to engage with one or more portions of the locking plate to secure the rotatable support block in at least one of a stowed position or a deployed position.

In some embodiments, the at least one support block may include translatable support block configured to translate via a translation sub-assembly between at least a stowed position or a deployed position.

In some embodiments, the translation sub-assembly may include a slot-and-roller assembly including one or more slots and one or more rollers, the translatable support block configured to translate via the one or more rollers between the at least stowed position and deployed position.

In some embodiments, the articulated mechanism may include a spring-loaded gas spring.

In some embodiments, the articulated mechanism may include a roller coupled to a portion of the seatback frame.

A self-supporting berthing platform system is disclosed, in accordance with one or more embodiments of the present disclosure. The self-supporting berthing platform system includes a plurality of articulated panels, the plurality of articulated panels including a first panel coupled to a second panel via at least one hinge assembly, the plurality of articulated panels configured to pivot between at least one of an upright position and a berth position via an articulated mechanism. The self-supporting berthing platform system includes a hinge reinforcement assembly, the hinge reinforcement assembly including a first reinforcement member coupled to a portion of the first panel, the hinge reinforcement assembly further including a second reinforcement member coupled to a portion of the second panel, the hinge reinforcement assembly further including a flange coupled to an additional portion of the second panel, a portion of the first reinforcement member configured to overlap with a portion of the second reinforcement member. The self-supporting berthing platform system includes a panel reinforcement assembly. The panel reinforcement assembly includes a first panel reinforcement member coupled to a portion of the first panel and a portion of at least one seatback frame of one or more seatback frames. The panel reinforcement assembly includes a second panel reinforcement member sub-assembly coupled to a portion of the second panel, the second panel reinforcement member sub-assembly including at least one panel leg and at least one support block.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 9B illustrates a perspective view of a pivot seat back mechanism of an aircraft seat, in accordance with one or more embodiments of the disclosure.

DETAILED DESCRIPTION OF THE INVENTION

Figure 1A:
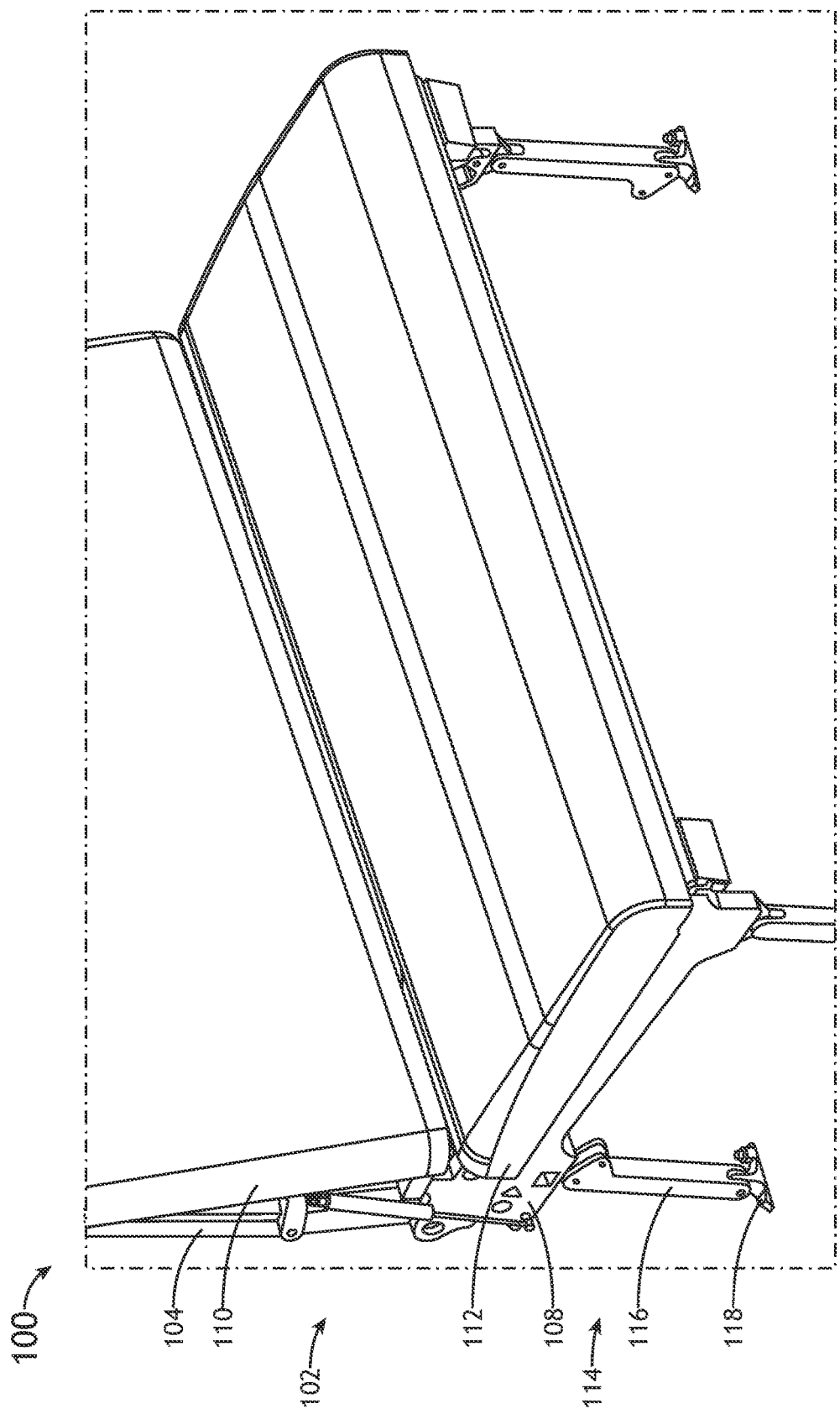
FIG. 1A illustrates a perspective view of an aircraft seat, in accordance with one or more embodiments of the disclosure.

Reference will now be made in detail to the subject matter disclosed, which is illustrated in the accompanying drawings.

Before explaining one or more embodiments of the disclosure in detail, it is to be understood the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

FIGS. 1A-9B in general illustrate a self-supporting berthing platform system, in accordance with one or more embodiments of the disclosure.

In select industries the build of the seat (and any included components within the build) may be required to meet guidelines and/or standards. For example, the aircraft seats may be required to meet aviation guidelines and/or standards. For instance, the select aircraft seats may need to be configured in accordance with aviation guidelines and/or standards put forth by, but not limited to, the Federal Aviation Administration (FAA), the European Aviation Safety Agency (EASA) or any other flight certification agency or organization; the American National Standards Institute (ANSI), or any other standards setting organization or company; or any other guidelines agency or organization; or the like. The berthing platform of the aircraft seat may present difficulties such as, but not limited to, failing to meet load requirements, or the like as set forth by the FAA in 14 C.F.R. Part 25, AIRWORTHINESS STANDARDS: TRANSPORT CATEGORY AIRPLANES).

For example, a conventional berthing platform is often supported by surrounding aircraft structures to withstand load requirements as set forth by aviation guidelines and/or standards. If left unsupported, the structure may become damaged when a load is applied to the berthing platform.

As such, it would be desirable to provide a self-supporting berthing platform system for an aircraft seat. The self-supporting berthing platform system should meet aviation guidelines and/or standards. For example, the self-supporting berthing platform should meet load requirements as set forth by aviation guidelines and/or standards (e.g., gust loading, in-flight loads, abuse loads, and the like). The self-supporting berthing platform system should be self-sufficient when in the berthed position. For example, the self-supporting berthing platform system should eliminate the need for external supports on adjacent aircraft structures (e.g., cabinetry, armrests, bulkhead, and the like) when in the berthed position. In this regard, the self-supporting platform system may reduce the complexities that may arise during the integration and operation of the product in its intended environment, such as complexities with the certification process.

Figure 1B:
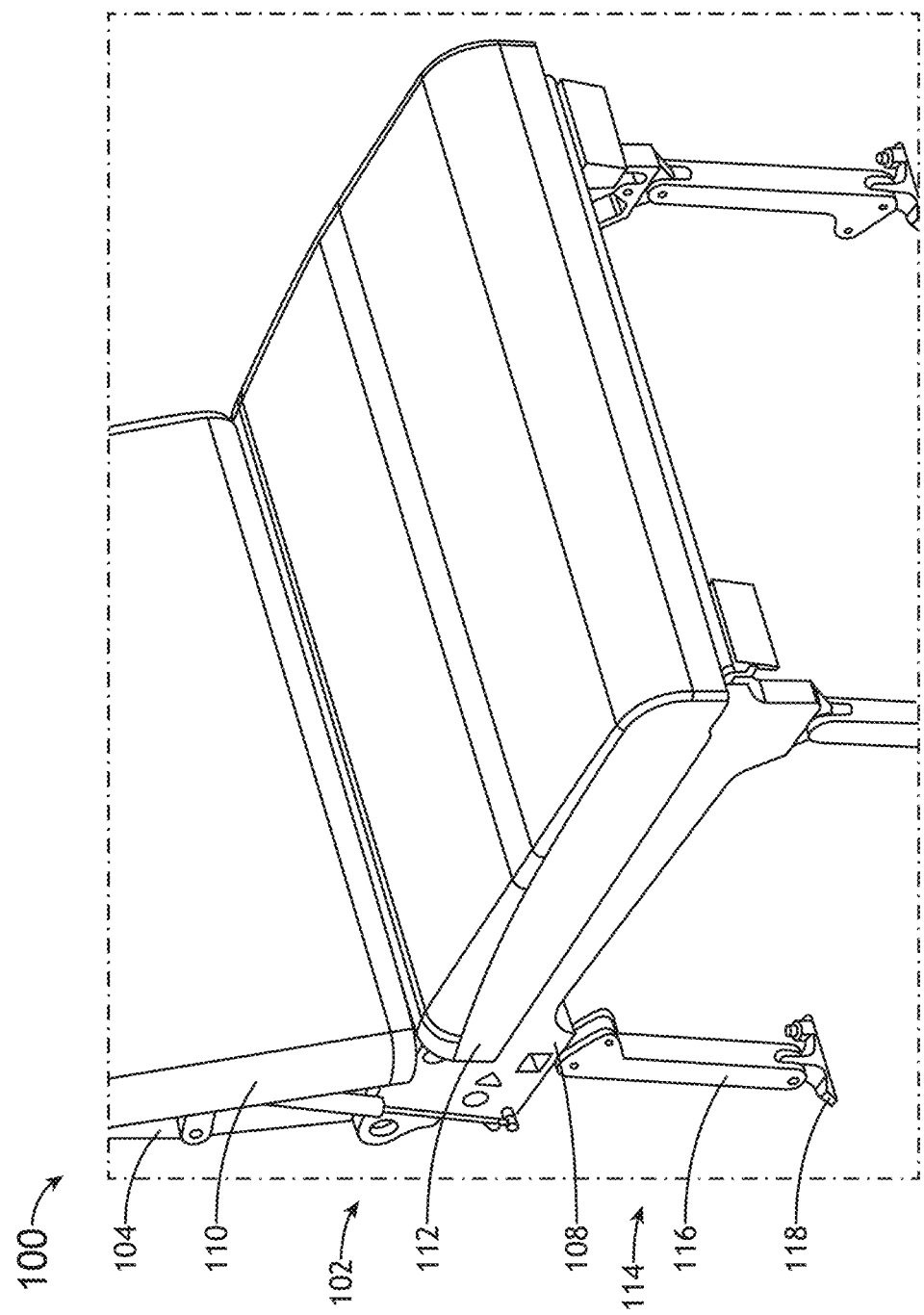
FIG. 1B illustrates a perspective view of an aircraft seat, in accordance with one or more embodiments of the disclosure.
Figure 2:
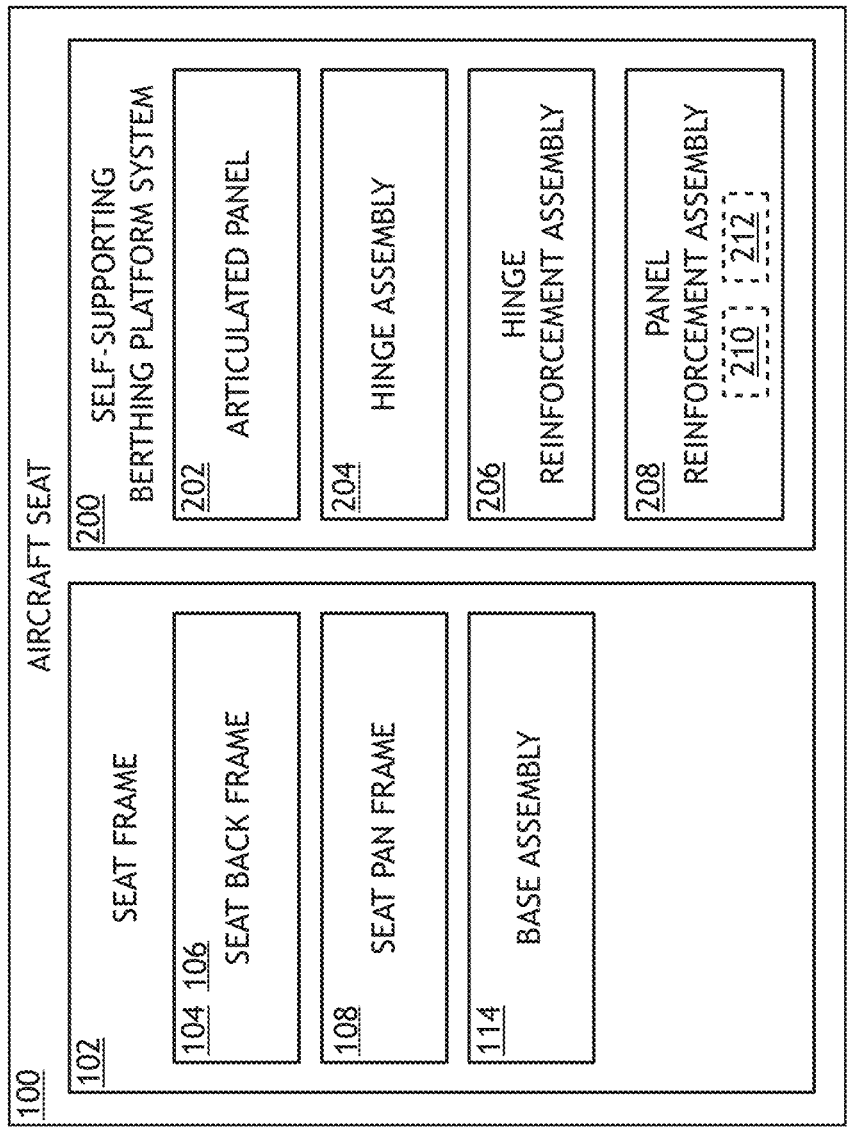
FIG. 2 illustrates a simplified block diagram of a self-supporting berthing platform system, in accordance with one or more embodiments of the disclosure.

FIGS. 1A-2 illustrate an aircraft seat 100, in accordance with one or more embodiments of present disclosure.

The aircraft seat 100 may include a seat frame 102. The seat frame 102 may include one or more seatback frames 104, 106 and a seat pan frame 108. One or more of the seat back frames 104,106 and/or the seat pan frame 108 may be directly coupled, or indirectly coupled via one or more interconnecting components, to the seat frame 102.

The seatback frame 104 may include a seatback cushion 110. The seat pan frame 108 may include a seat pan cushion 112.

The aircraft seat 100 may include a base assembly 114. The base assembly 114 may include one or more legs 116. The one or more legs 116 may be coupled to a set of floor tracks of the aircraft cabin (via one or more floor fittings 118).

The aircraft seat 100 may be rotatable about an axis (e.g., swivelable) or translatable (e.g., trackable or slidable). The aircraft seat 100 may be rotatable about an axis cross-wise in the aircraft seat 100 into a position including, but not limited to, a stowed position or one or more deployed positions. The aircraft seat 100 may be fully positionable between the outer limits of motion as defined by the moveable components of the aircraft seat 100. Where the aircraft seat 100 is installed within an aisle, a walkway, a galley, and/or an entrance to/egress from the aircraft, the aircraft seat 100 may be fully positionable between the outer limits of motion as defined by surrounding interior structures within the aisle, the walkway, the galley, and/or the entrance to/egress from the aircraft. It is noted an upright or raised position may be considered a taxi, takeoff, or landing (TTL) position during select stages of flight (though the upright or raised position is not limited to use during the select stages of flight as the TTL position, but also may be used at any point during the flight), for purposes of the present disclosure. In addition, it is noted herein that any position that does not meet the above-defined requirements of the TTL position may be considered a non-TTL position, for purposes of the present disclosure. Further, it is noted the aircraft seat 100 may be actuatable (e.g., translatable and/or rotatable) from the TTL position to a non-TTL position, and/or vice versa. Further, it is noted the aircraft seat 100 may be capable of a fully upright or raised position, and that the TTL position may have a more reclined seatback cushion and a more angled upward seat pan cushion as compared to the fully upright or raised position. Therefore, the above description should not be interpreted as a limitation on the present disclosure but merely an illustration.

Referring generally to FIGS. 2-9B, the aircraft seat 100 may include a self-supporting berthing platform system 200.

The system 200 may include a plurality of articulated panels 202. For example, the system 200 may include at least a first panel 202a (e.g., rear panel 202a) and an additional panel 202b (e.g., front panel 202b), where the first and second panels 202a, 202b are reversibly coupled together via one or more hinge assemblies 204. In this regard, the plurality of articulated panels 202 may be configured to actuate between at least a first position and a second position via the one or more hinge assemblies 204. For example, the plurality of articulated panels 202 may be configured to actuate between an upright position and a berth position.

Figure 3:
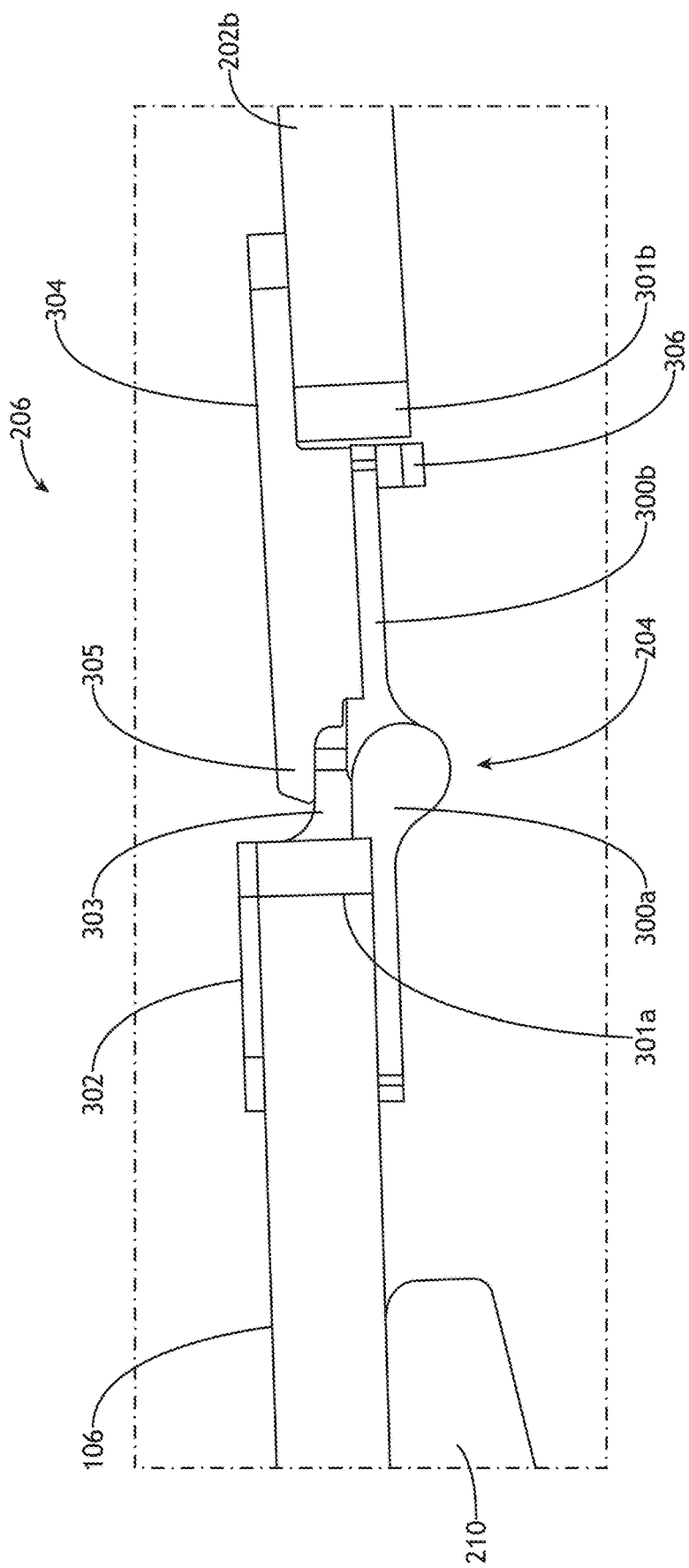
FIG. 3 illustrates a side view of a hinge reinforcement assembly of the self-supporting berthing platform system, in accordance with one or more embodiments of the disclosure.

Referring to FIG. 3, each hinge assembly 204 may include at least a first leaf 300a coupled to a side 301a of the first articulated panel 202a (e.g., rear panel 202a) and a second leaf 300b coupled to a side 301b of an additional articulated panel 202b (e.g., front panel 202b). For example, the first leaf 300a may be configured to mate with a portion of the second leaf 300b, such that the articulated panels 202a, 202b may fold along the center axis of the hinge assembly 204 when actuated (e.g., folded).

The system 200 may include a hinge reinforcement assembly 206. For example, the system 200 may include a hinge reinforcement assembly 206 positioned proximate to the one or more hinge assembles 204. For instance, as shown in FIGS. 3-4B and 9A-9B, the hinge reinforcement assembly 206 may be coupled to a first side 301a of the first articulated panel 202a (e.g., rear panel 202a) and a second side 301b of the additional articulated panel 202b (e.g., front panel 202b).

Referring to FIG. 3, the hinge reinforcement assembly 206 may include a first reinforcement portion 302 (e.g., rear panel reinforcement portion 302) coupled to a side 301a of the first articulated panel 202a (e.g., rear panel 202a). The hinge reinforcement assembly 206 may further include a second reinforcement portion 304 (e.g., front panel reinforcement portion 304) coupled to a side 301b of the second articulated panel 202b (e.g., front panel 202b). The first reinforcement portion 302 may be positioned proximate to the second reinforcement portion 304. For example, a portion 303 of the first reinforcement portion 302 may overlap with a portion 305 of the second reinforcement portion 304. In this regard, the overlapping portions 303, 305 may be configured to transfer the load to the pivot arm.

The hinge reinforcement assembly 206 may further include a flange portion 306 coupled to the side 301b of the second articulated panel 202b and a portion of the second leaf 300b of the hinge assembly 204. For example, the flange portion 306 may be coupled to a bottom surface of the second leaf 300b and the second reinforcement portion 304 may be coupled to a top surface of the second leaf 300b. In this regard, the flange portion 306 may be configured to increase the bending strength of the system 200.

It is noted that the hinge reinforcement assembly 206 may be formed of any material such as, but not limited to, one or more metals, one or more composite materials, and the like.

Referring again to FIG. 2, the system 200 may further include a panel reinforcement assembly 208. The panel reinforcement assembly 208 may include a first panel support member 210 (e.g., a rear panel support member 210) coupled to a side 401a of the first articulated panel (e.g., rear panel 202a) and to a portion of the seat back frame 104. The rear panel support member 210 may be coupled to the first articulated panel 202a via any coupling mechanism such as, but not limited to, one or more fasteners (e.g., screws, bolts, or the like), or the like. The panel reinforcement assembly 208 may further include a front panel support sub-assembly 212 coupled to a side 401b of the second articulated panel (e.g., front panel 202b).

Figure 4A:
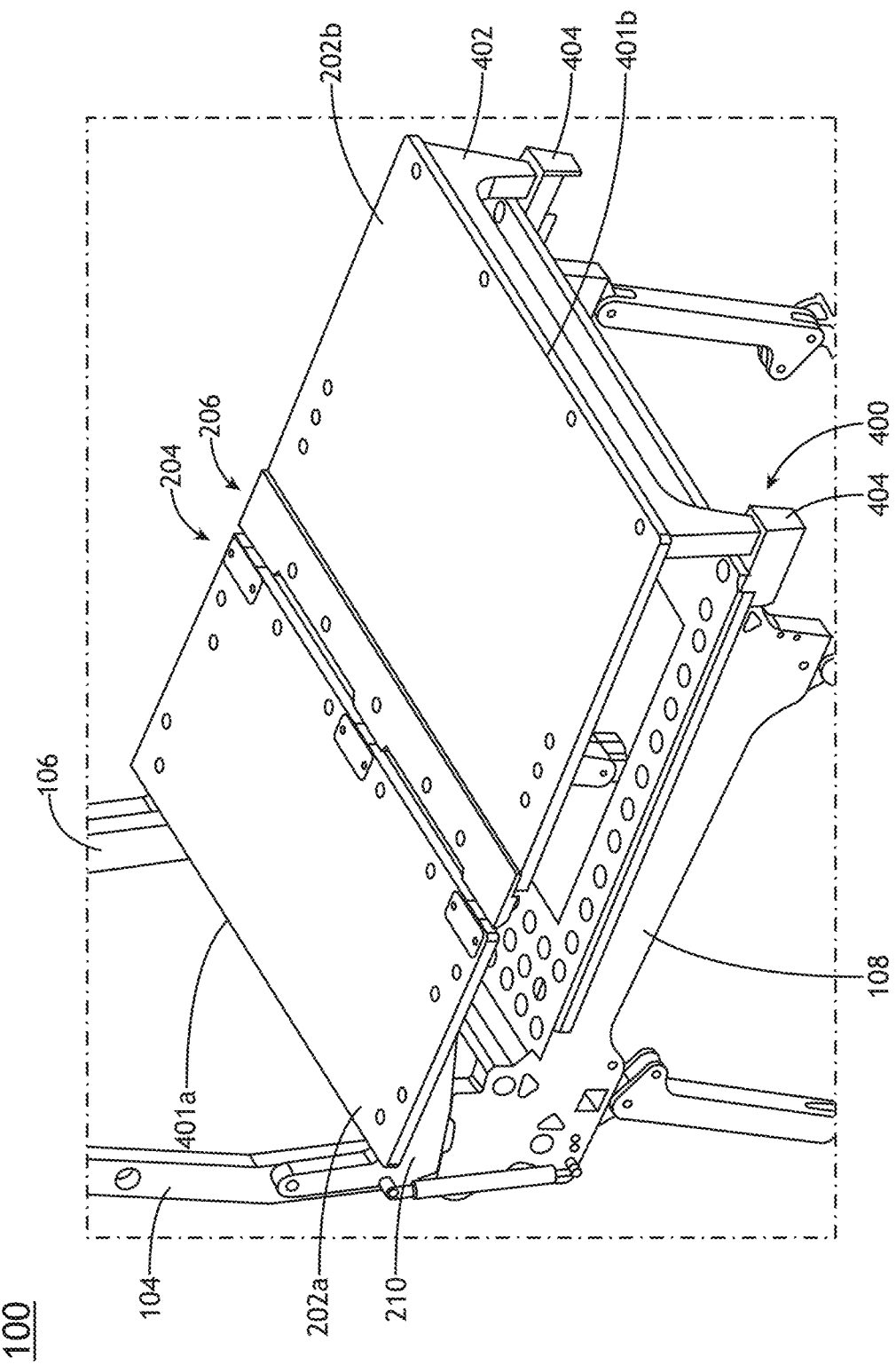
FIG. 4A illustrates a perspective view of an aircraft seat including a front support sub-assembly of the self-supporting berthing platform system, in accordance with one or more embodiments of the disclosure.
Figure 4B:
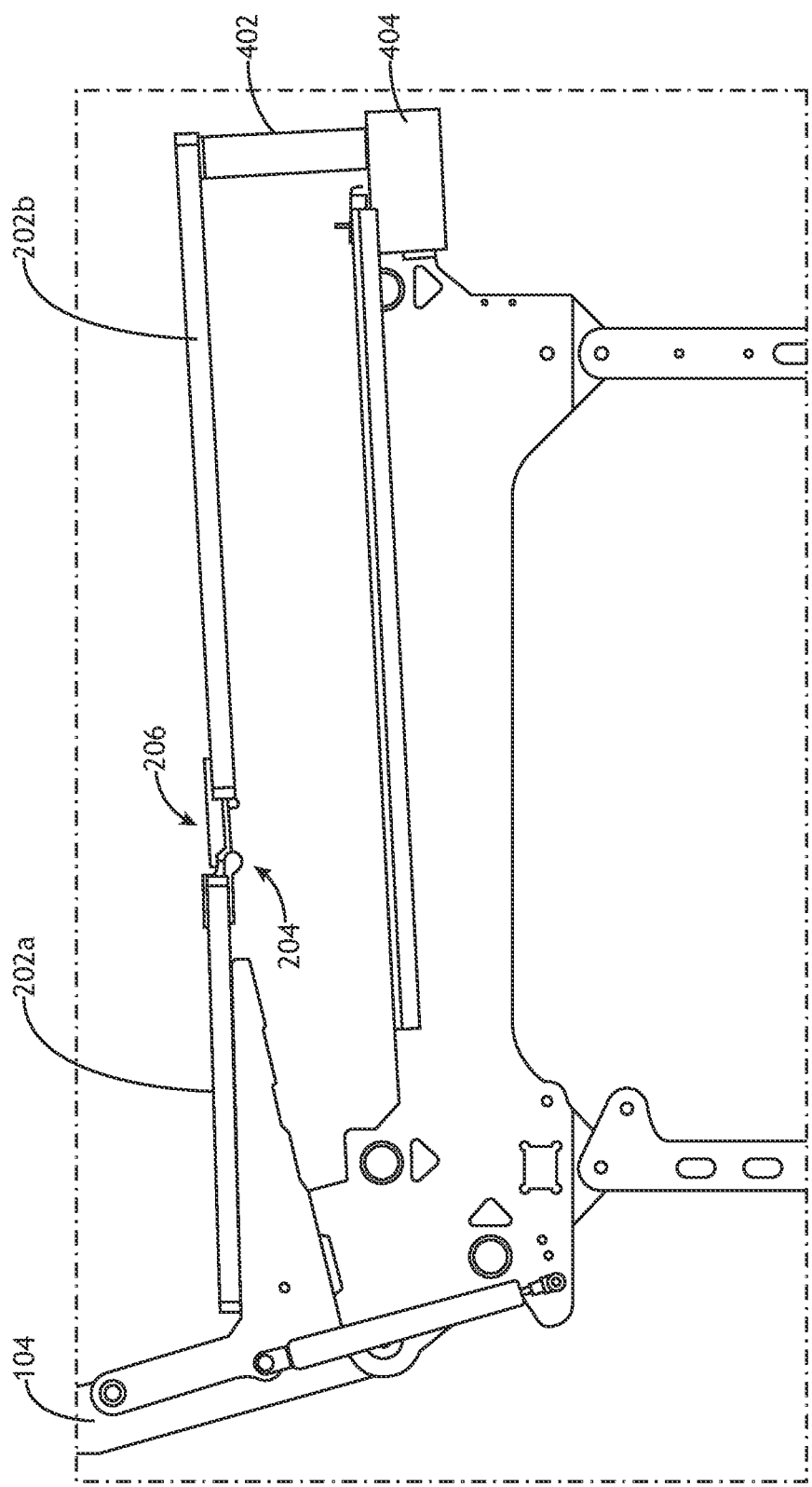
FIG. 4B illustrates a side view of an aircraft seat including a front support sub-assembly of the self-supporting berthing platform system, in accordance with one or more embodiments of the disclosure.

FIG. 4A illustrates a perspective view the aircraft seat 100 including a front support sub-assembly 400 of the self-supporting berthing platform system 200, in accordance with one or more embodiments of the disclosure. FIG. 4B illustrates a side view the aircraft seat 100 including the front support sub-assembly 400 of the self-supporting berthing platform system 200, in accordance with one or more embodiments of the disclosure.

Figure 6A:
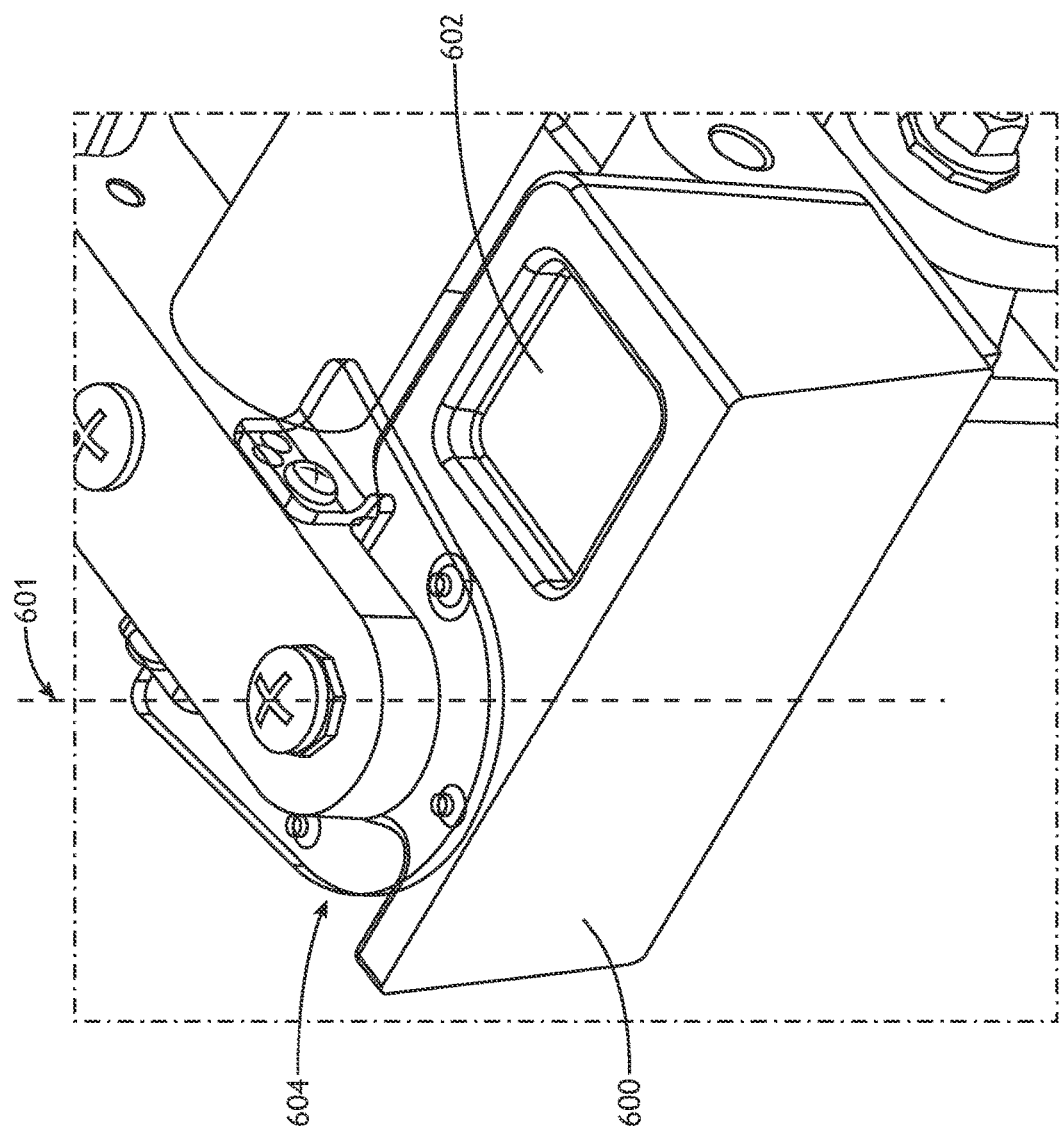
FIG. 6A illustrates a perspective view of a rotatable block sub-assembly of the self-supporting berthing platform system in a stowed position, in accordance with one or more embodiments of the disclosure.
Figure 6B:
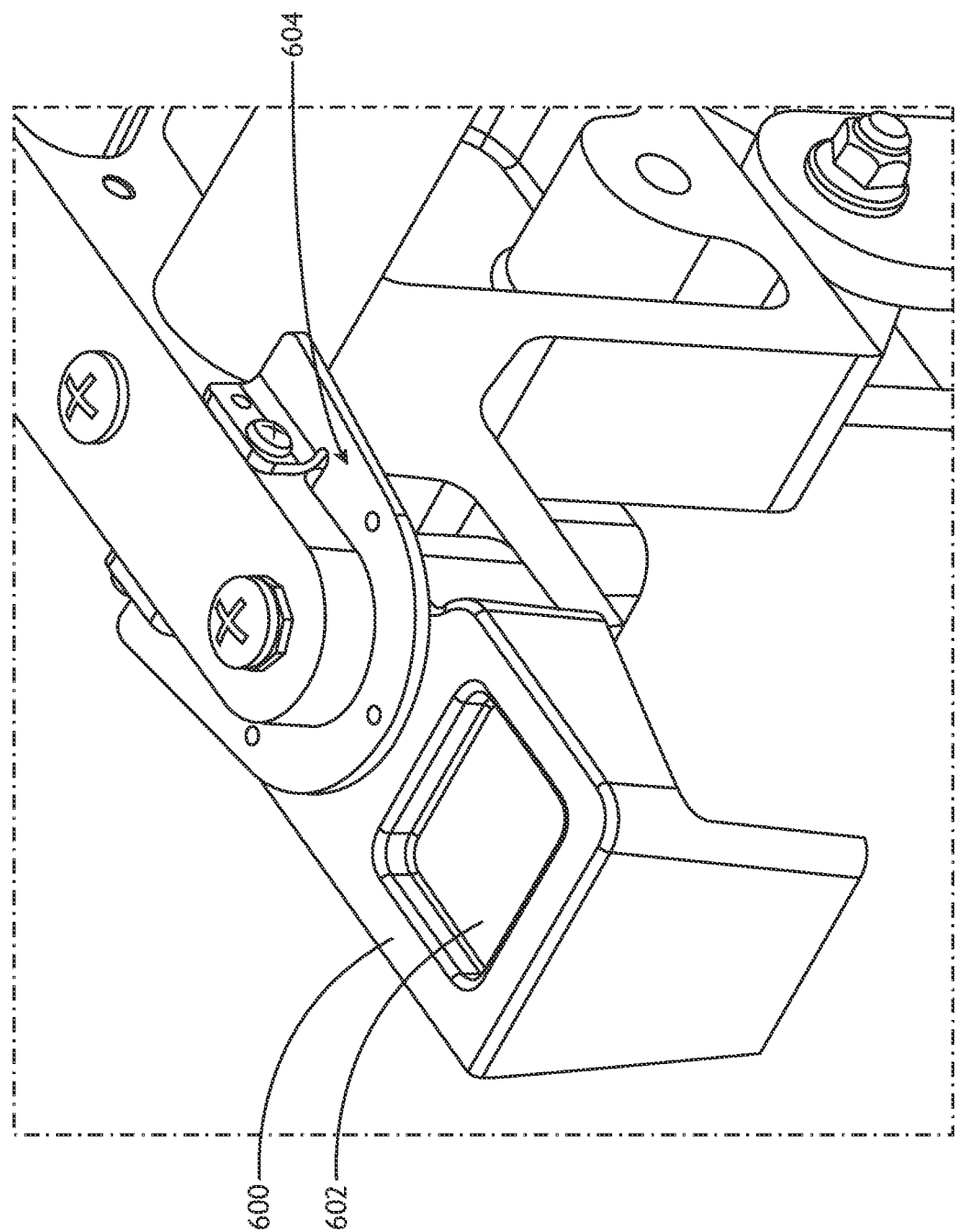
FIG. 6B illustrates a perspective view of a rotatable block sub-assembly of the self-supporting berthing platform system in a deployed position, in accordance with one or more embodiments of the disclosure.
Figure 6C:
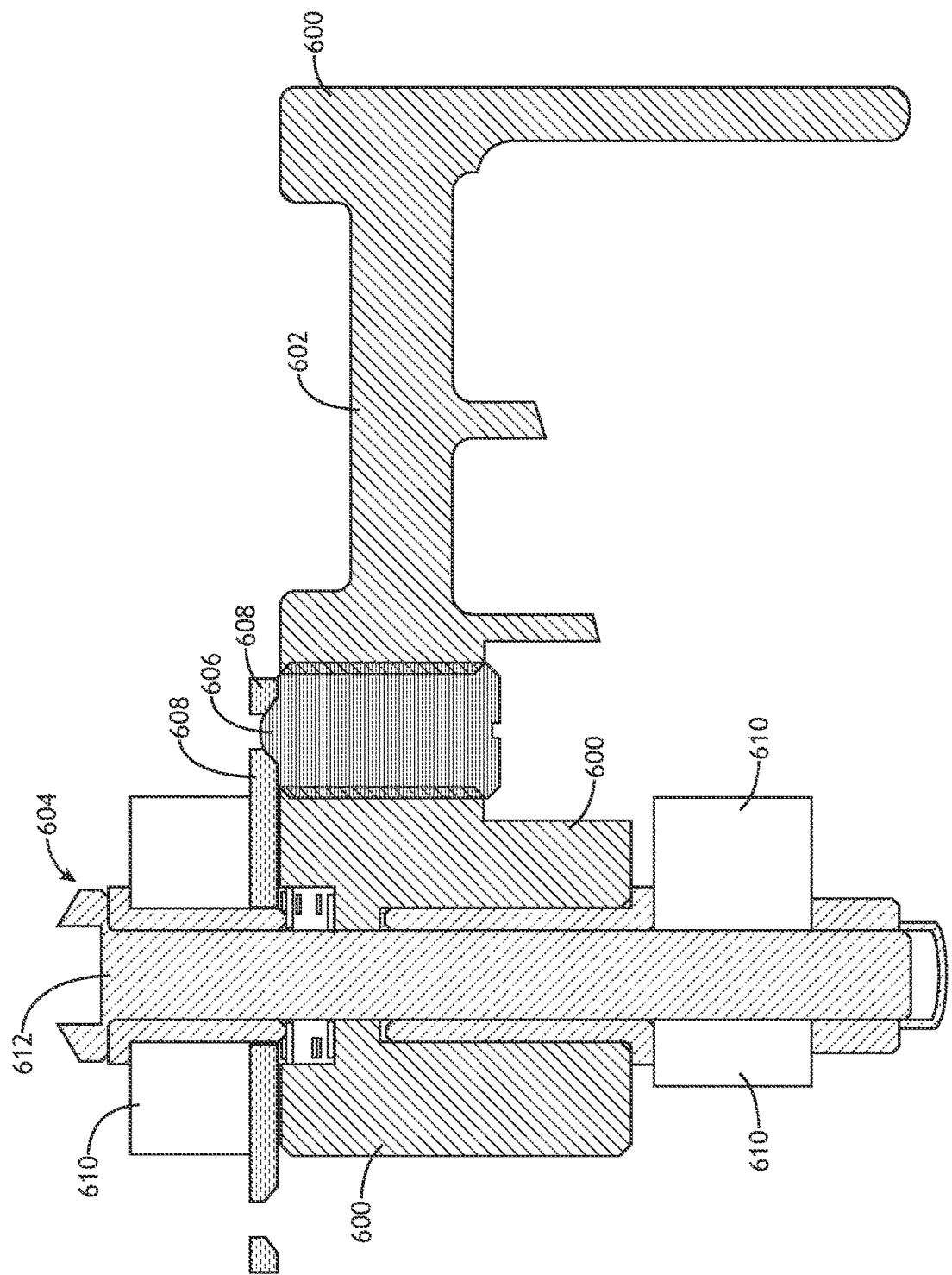
FIG. 6C illustrates a cross-sectional view of a rotatable block sub-assembly of the self-supporting berthing platform system, in accordance with one or more embodiments of the disclosure.

The front panel support sub-assembly 212 may include a front support sub-assembly 400 including a panel leg support member 402 and one or more rotatable support block sub-assemblies 404 (as discussed further herein with respect to FIGS. 6A-6C). For example, the panel leg support member 402 may be configured to couple to a bottom surface of the front panel 202b. The panel leg support member 402 may be coupled to the front panel 202b via any coupling mechanism such as, but not limited to, one or more fasteners (e.g., screws, bolts, or the like), or the like.

When the one or more rotatable support block sub-assemblies 404 are in the deployed position (as shown in FIGS. 4A-4B), the panel support member 402 may be supported by a portion of the one or more rotatable support block sub-assemblies 404. In this regard, when the panels 202 are in the berthed position, the front panel support sub-assembly 400 may be configured to reinforce at least the front panel 202b when load is applied to the system 200 (or aircraft seat 100).

Figure 5A:
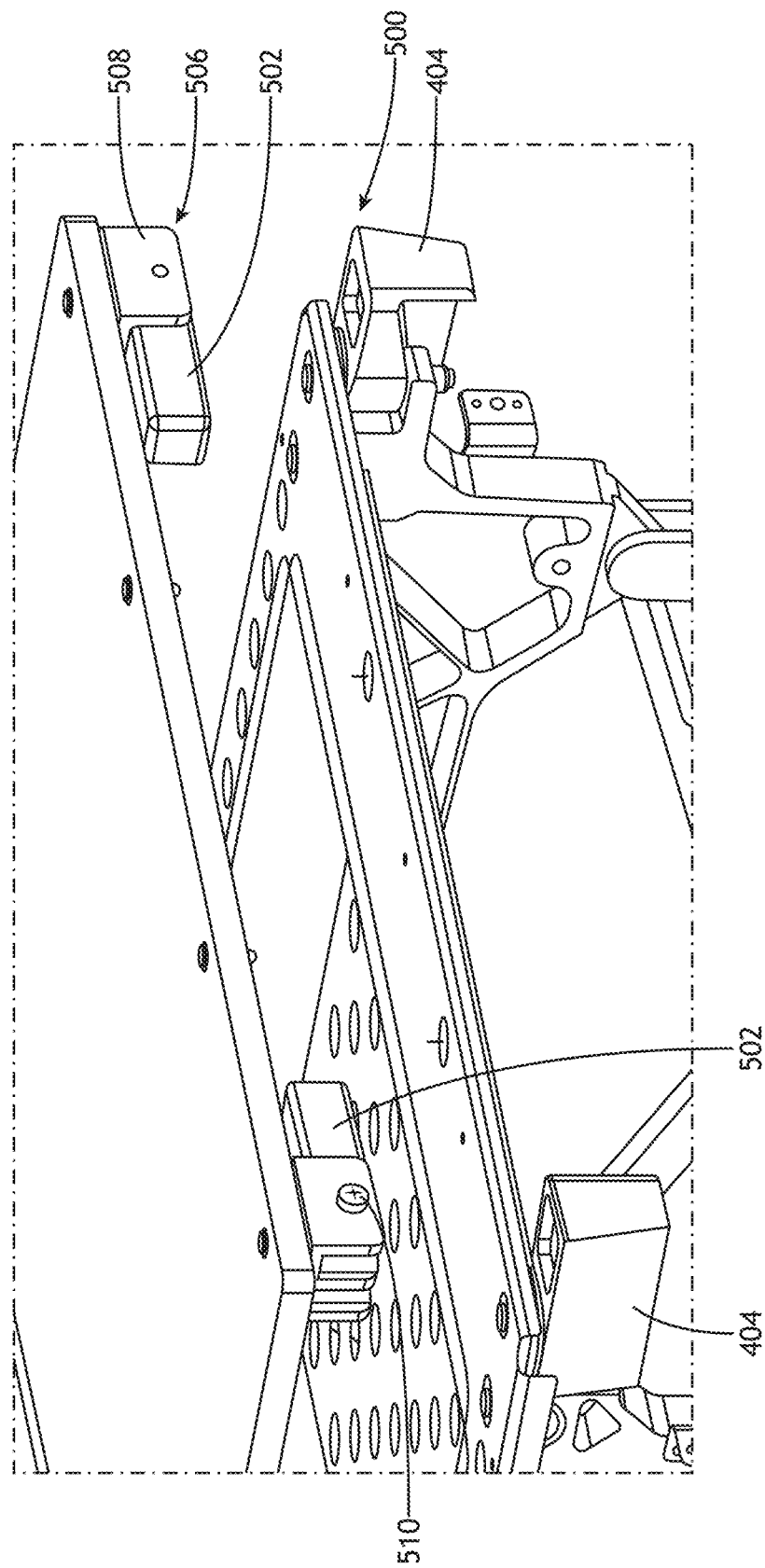
FIG. 5A illustrates a perspective view of an aircraft seat including a front support sub-assembly of the self-supporting berthing platform system in a stowed position, in accordance with one or more embodiments of the disclosure.
Figure 5B:
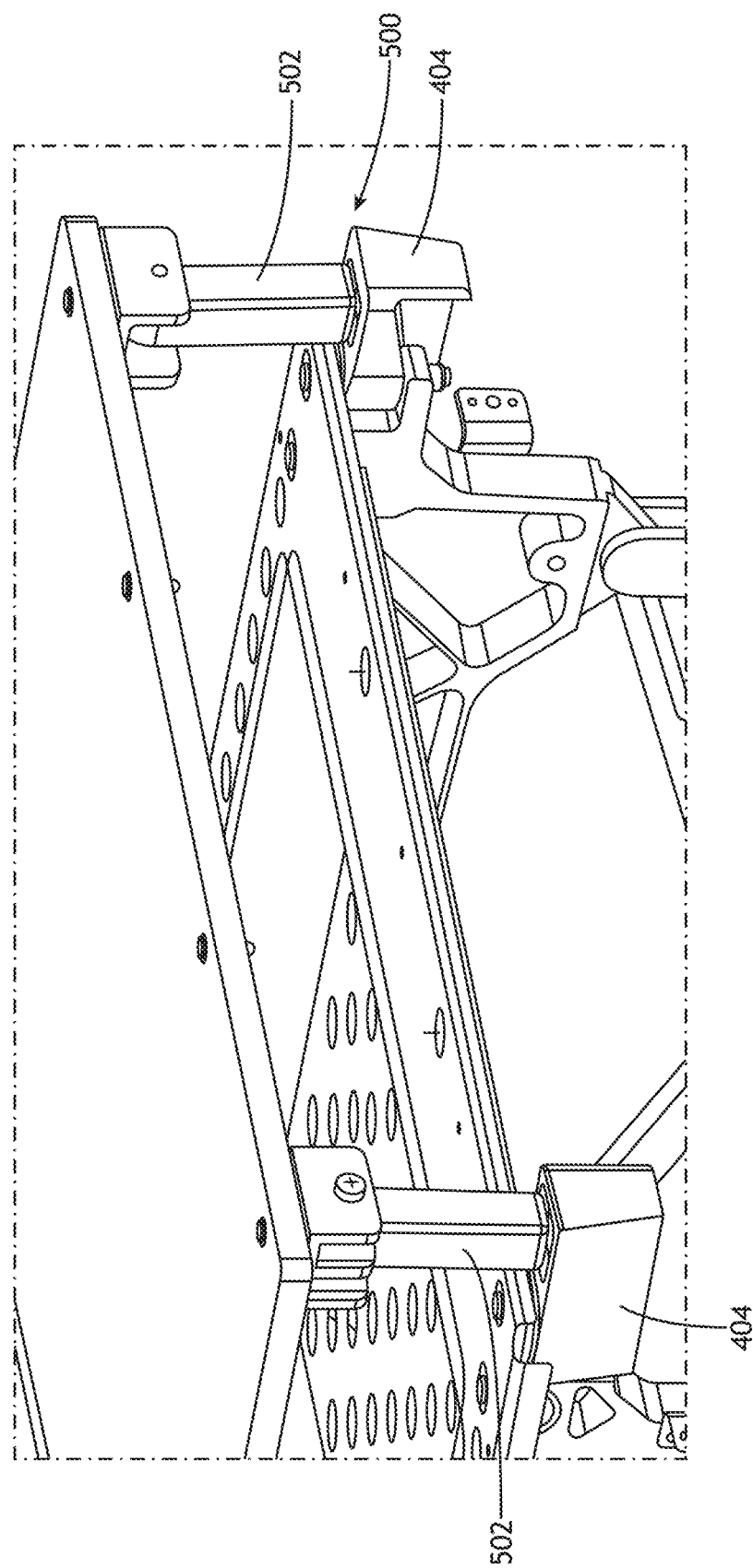
FIG. 5B illustrates a perspective view of an aircraft seat including a front support sub-assembly of the self-supporting berthing platform system in a deployed position, in accordance with one or more embodiments of the disclosure.

FIG. 5A illustrates a perspective view of the aircraft seat 100 including a front support sub-assembly 500 of the self-supporting berthing platform in a stowed position, in accordance with one or more embodiments of the disclosure. FIG. 5B illustrates a perspective view of the aircraft seat 100 including a front support sub-assembly 500 of the self-supporting berthing platform in a deployed position, in accordance with one or more embodiments of the disclosure.

The front panel support sub-assembly 212 may include a front support sub-assembly 500 including one or more pivotable legs 502 and one or more rotatable support block sub-assemblies 404 (as discussed further herein with respect to FIGS. 6A-6C). For example, a first pivotable leg 502 may be configured to couple to a first portion of the bottom surface of the front panel 202b and a second pivotable leg 502 may be configured to couple to a second portion of the bottom surface of the front panel 202b. The one or more rotatable legs 502 may be coupled to the front panel 202b via any coupling mechanism such as, but not limited to, one or more fasteners (e.g., screws, bolts, or the like), or the like.

Each pivotable leg 502 may be configured to pivot about an axis between a stowed position (as shown in FIG. 5A) and a deployed position (as shown in FIG. 5B) via a pivot mechanism sub-assembly 506. For example, the pivot mechanism sub-assembly 506 may include a bracket 508 and a fastener 510. For instance, the bracket 508 may be coupled to the bottom side of the front panel 202b and a top portion of the pivotable leg 502, where the fastener 510 pivotably couples the bracket 508 to the pivotable leg 502. In this regard, the pivotable leg 502 may be configured to pivot about an axis along the fastener 510 between the stowed and deployed position.

When the one or more rotatable support block sub-assemblies 404 are in the deployed position (as shown in FIGS. 5A-5B), the pivotable legs 502 may be supported by a portion of the one or more rotatable support block sub-assemblies 404. In this regard, when the front panel 202b is in the berthed position, the one or more pivotable legs 502 and support block sub-assemblies 404 may be deployed to reinforce at least the front panel 202b when load is applied to the system 200 (or aircraft seat 100).

FIG. 6A illustrates a perspective view of the one or more rotatable support block sub-assemblies 404 of the self-supporting berthing platform system 200 in a stowed position, in accordance with one or more embodiments of the disclosure. FIG. 6B illustrates a perspective view of the one or more rotatable support blocks 404 of the self-supporting berthing platform system 200 in a deployed position, in accordance with one or more embodiments of the disclosure. FIG. 6C illustrates a cross-sectional view of the one or more rotatable support blocks 404 of the self-supporting berthing platform system 200, in accordance with one or more embodiments of the disclosure.

Each of the rotatable block sub-assemblies 404 may include a rotatable support block 600 including a cavity 602 and a rotation sub-assembly 604.

The rotatable block 600 may be configured to rotatable about a pivot axis 601 between a stowed position (as shown in FIG. 6A) and a deployed position (as shown in FIG. 6B) via the rotation sub-assembly 604. For example, when in the deployed position, rotatable block 600 may be configured to provide support for the leg (e.g., panel leg 402, pivotable leg 502, or the like). For instance, the cavity 602 of the rotatable support block 600 may be positioned proximate to the leg (e.g., panel leg 402, pivotable leg 502, or the like) to support the leg (e.g., panel leg 402, pivotable leg 502, or the like) in the deployed position.

Each rotation sub-assembly 604 may include, but is not limited to, a ball plunger 606, a locking plate 608, a bracket 610, and a fastener 612. For example, the ball plunger 606 may be configured to engage with one or more portions of the locking plate 608 to secure the block 600 to in at least one of a stowed position or a deployed position. In one instance, the ball plunger 606 may engage with a first portion of the locking plate 608 to secure the block 600 in a stowed position. In another instance, the ball plunger 606 may engage with a second portion of the locking plate 608 to secure the block 600 in a deployed position.

The bracket 610 may be configured to couple the rotation sub-assembly 604 to a portion of the seat pan frame via the fastener 612. For example, the bracket 610 may be configured to couple the rotation sub-assembly 604 to a bottom surface of the seat pan frame via the fastener 612.

Figure 7A:
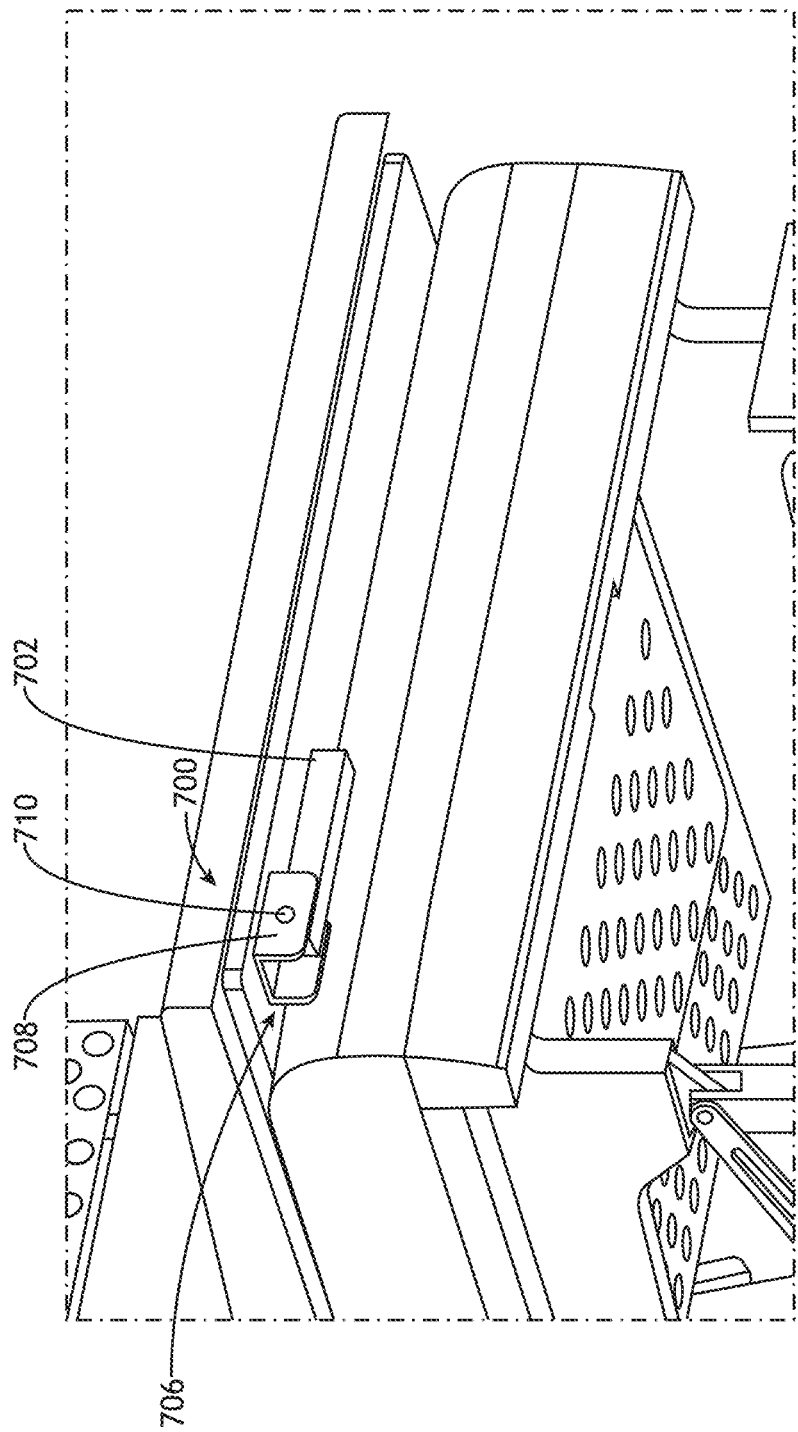
FIG. 7A illustrates a perspective view of an aircraft seat including a front support sub-assembly of the self-supporting berthing platform system in a stowed position, in accordance with one or more embodiments of the disclosure.
Figure 7B:
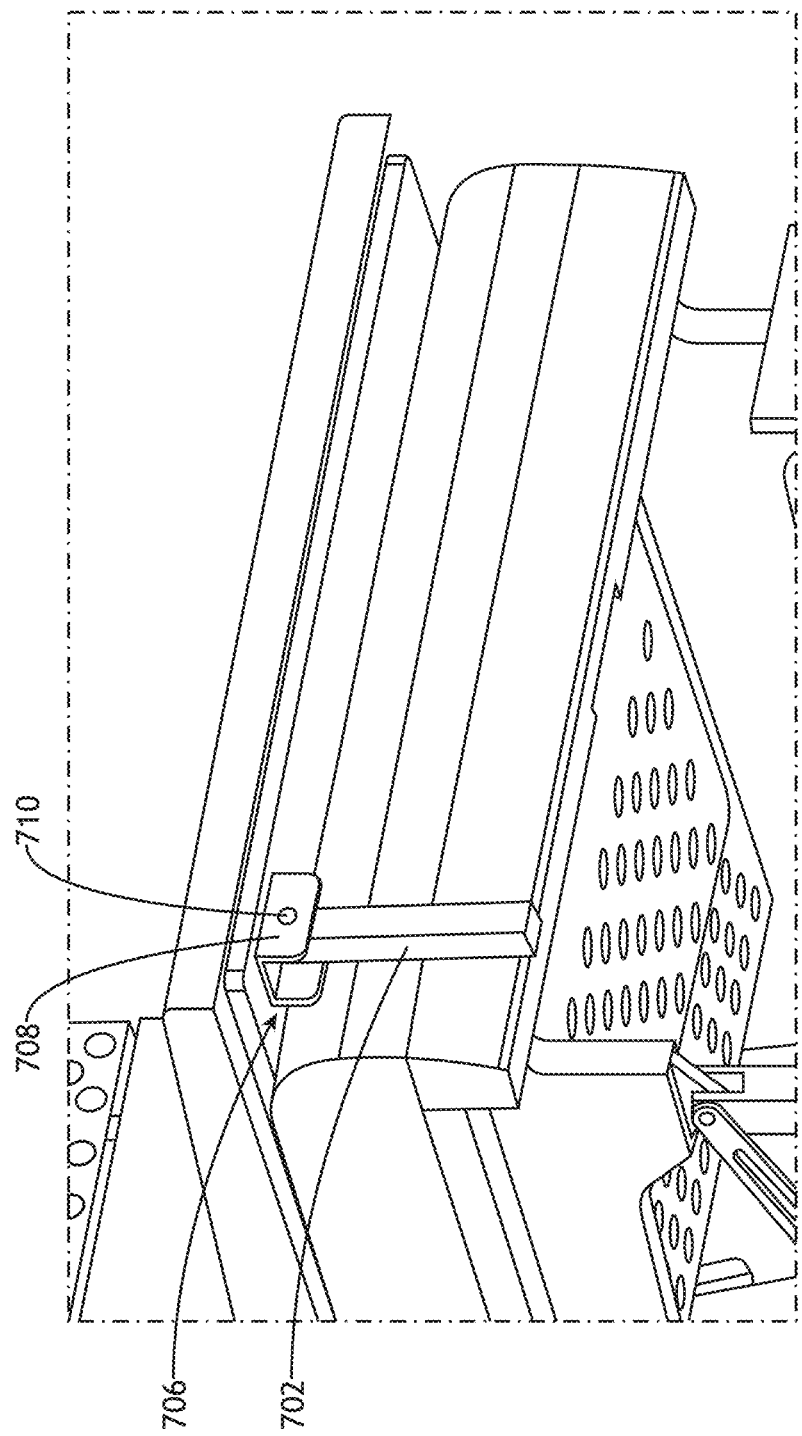
FIG. 7B illustrates a perspective view of an aircraft seat including a front support sub-assembly of the self-supporting berthing platform system in a deployed position, in accordance with one or more embodiments of the disclosure.
Figure 7C:
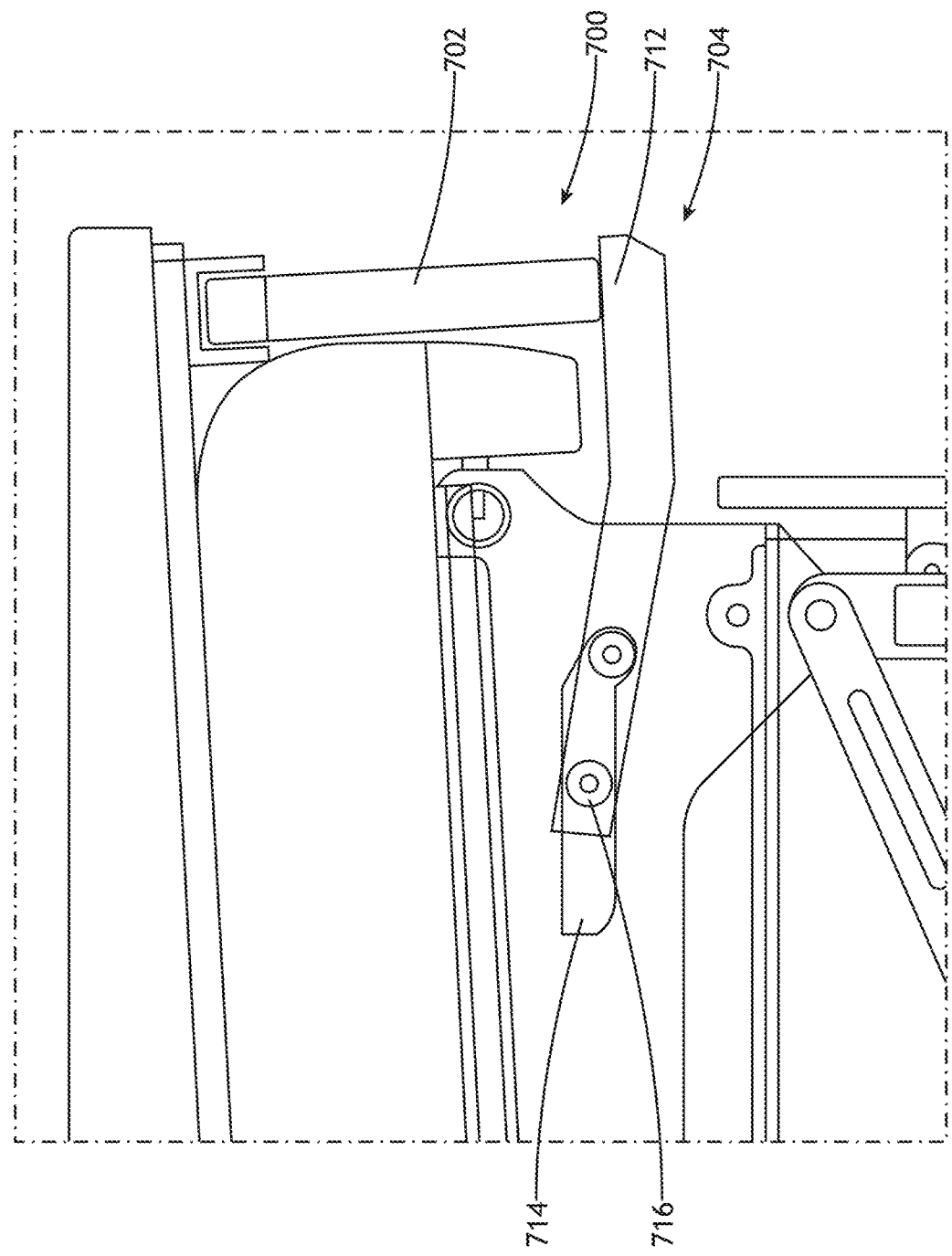
FIG. 7C illustrates a side view of an aircraft seat including a front support sub-assembly of the self-supporting berthing platform system in a deployed position, in accordance with one or more embodiments of the disclosure.

FIG. 7A illustrates a perspective view of the aircraft seat 100 including a front support sub-assembly 400 of the self-supporting berthing platform system 200 in a stowed position, in accordance with one or more embodiments of the disclosure. FIG. 7B illustrates a perspective view of the aircraft seat 100 including a front support sub-assembly 400 of the self-supporting berthing platform system 200 in a deployed position, in accordance with one or more embodiments of the disclosure. FIG. 7C illustrates a side view of the aircraft seat 100 including a front support sub-assembly 400 of the self-supporting berthing platform system 200 in a deployed position, in accordance with one or more embodiments of the disclosure.

The front panel support sub-assembly 212 may include a front support sub-assembly 700 including one or more pivotable legs 702 and one or more translatable support block sub-assemblies 704 (as discussed further herein with respect to FIGS. 6A-6C). For example, a first pivotable leg 702 may be configured to couple to a first portion of the bottom surface of the front panel 202b and a second pivotable leg 702 may be configured to couple to a second portion of the bottom surface of the front panel 202b. The one or more pivotable legs 702 may be coupled to the front panel 202b via any coupling mechanism such as, but not limited to, one or more fasteners (e.g., screws, bolts, or the like), or the like.

Each pivotable leg 702 may be configured to pivot about an axis between a stowed position (as shown in FIG. 7A) and a deployed position (as shown in FIG. 7B) via pivot mechanism sub-assembly 706. For example, the pivot mechanism sub-assembly 706 may include a bracket 708 and a fastener 710. For instance, the bracket 708 may be coupled to the bottom side of the front panel 202b and a top portion of the pivotable leg 702, where the fastener 710 pivotably couples the bracket 708 to the pivotable leg 702. In this regard, the pivotable leg 702 may be configured to pivot about an axis along the fastener 710 between the stowed and deployed position.

Each translatable block sub-assembly 704 may include a support block 712 and slot-and-roller translation assembly including one or more slots 714 and one or more rollers 716. For example, the slot-and-roller translation assembly may be configured to translate the support block 712 between a stowed and deployed position. For instance, the support block 712 may translate via the rollers 716 to the deployed position to provide support for the pivotable leg 702 when in the deployed position.

When the one or more translatable support block sub-assemblies 704 are in the deployed position (as shown in FIGS. 7A-7B), the pivotable legs 702 may be supported by a portion of the one or more translatable support block sub-assemblies 704. In this regard, when the front panel 202b is in the berthed position, the one or more pivotable legs 702 and support block sub-assemblies 704 may be deployed to reinforce at least the front panel 202b when load is applied to the system 200 (or aircraft seat 100).

Figure 8A:
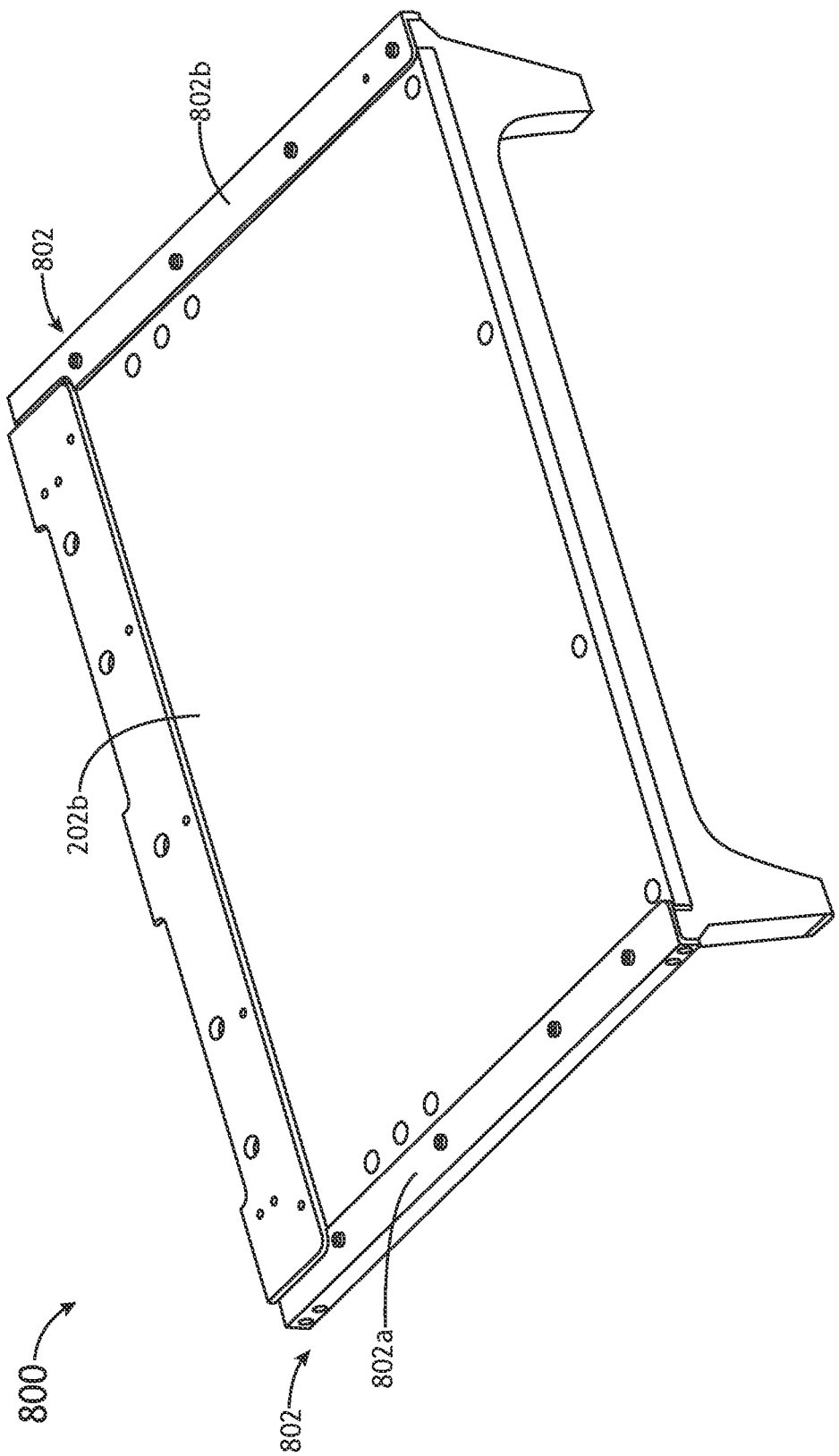
FIG. 8A illustrates a top perspective view of the self-supporting berthing platform system including a panel frame sub-assembly, in accordance with one or more embodiments of the disclosure.
Figure 8B:
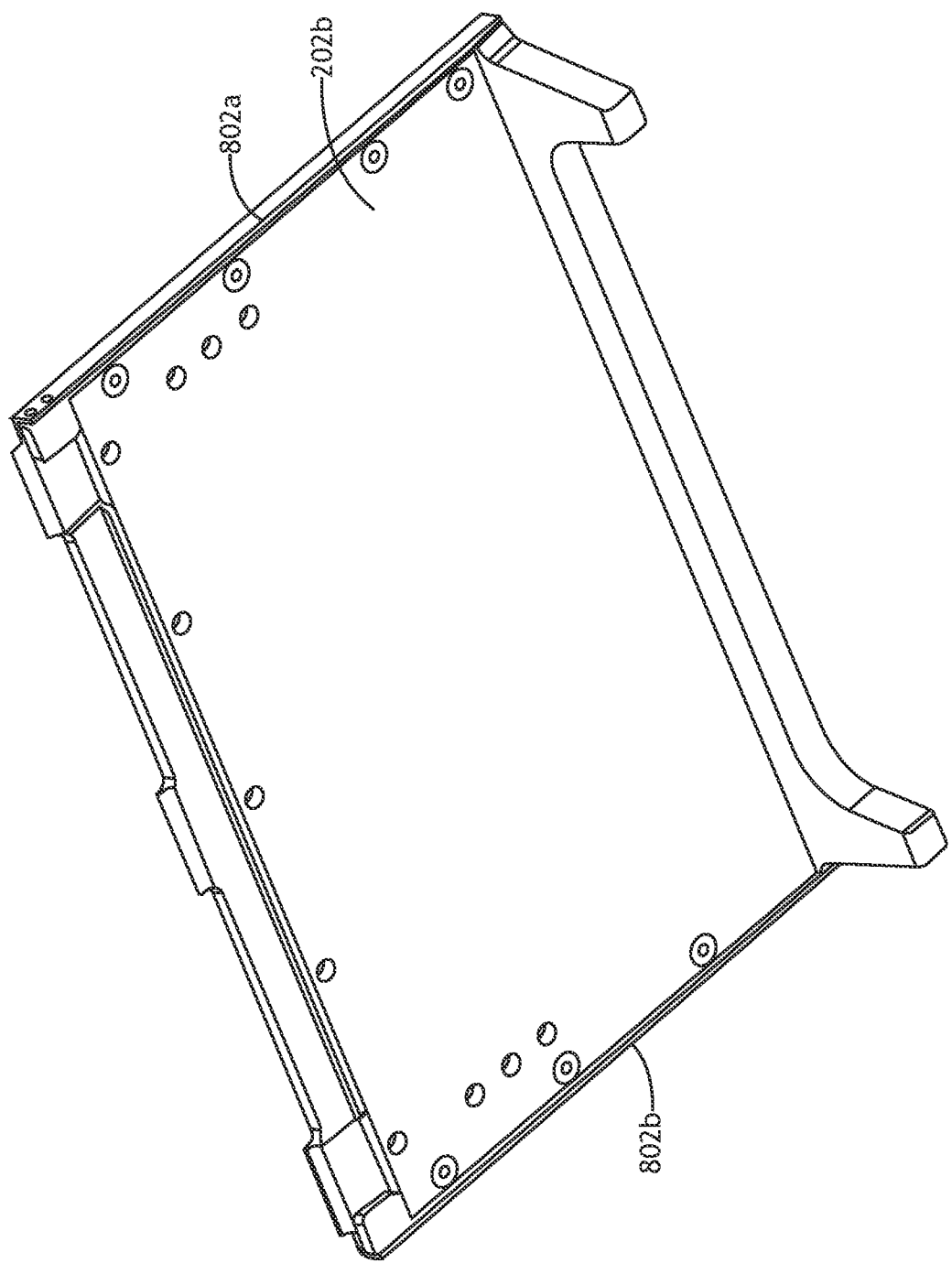
FIG. 8B illustrates a bottom perspective view of the self-supporting berthing platform system including a panel frame sub-assembly, in accordance with one or more embodiments of the disclosure.

FIG. 8A illustrates a top perspective view of the self-supporting berthing platform system 200 including a panel frame sub-assembly 800, in accordance with one or more embodiments of the disclosure. FIG. 8B illustrates bottom perspective view of the self-supporting berthing platform system 200 including a panel frame sub-assembly 800, in accordance with one or more embodiments of the disclosure.

In some embodiments, the system 200 may include a panel frame sub-assembly 800. For example, the panel frame sub-assembly 800 include one or more framing members 802 coupled to one or more edges of the one or more articulated panels 202. For instance, as shown in FIGS. 8A-8B, the frame sub-assembly 800 may include a first framing member 802a coupled to a first edge (e.g., left edge) of the front articulated panel 202b and a second frame member 802b coupled to a second edge (e.g., right edge) of the front articulated panel 202b. The one or more framing members 802 may be coupled to the front panel 202b via any coupling mechanism such as, but not limited to, one or more fasteners (e.g., screws, bolts, or the like), or the like.

It is noted that the panel frame sub-assembly 800 may provide additional reinforcement to withstand high load requirements.

Figure 9A:
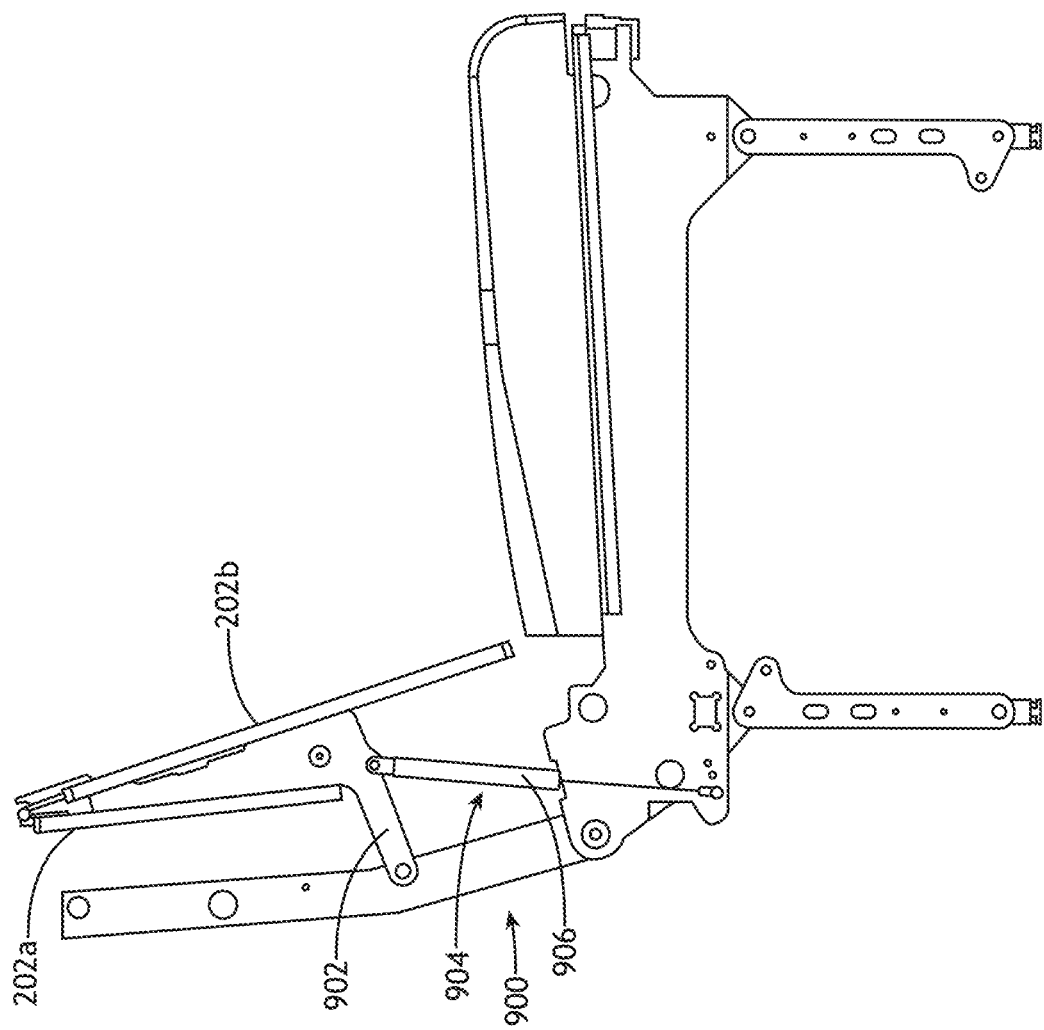
FIG. 9A illustrates a side view of an aircraft seat including a pivot seat back mechanism, in accordance with one or more embodiments of the disclosure.

FIGS. 9A-9B illustrates a perspective view of an articulated seatback mechanism 900 of an aircraft seat 100, in accordance with one or more embodiments of the disclosure.

The articulated seatback mechanism 900 may include a pivot arm 902 and an actuator 904. For example, the pivot arm 902 may couple to a portion of the system 200 to cause the system 200 to actuate between the upright and berth position.

The actuator 904 may include any type of actuator. For example, as shown in FIGS. 9A-9B, the actuator 904 may include a gas spring 906, where a gas spring axis may be slightly oriented at a different angle than the axis line joining the arm pivot and gas spring fixed end. In this regard, the gas spring 906 may be configured to lock the seatback in a berthing position.

In some embodiments, the articulated seatback mechanism 900 may include a roller 908 configured to prevent the seatback from falling. For example, the seat frame 102 may include a roller 908 coupled to a portion of the seat frame 102.

Although the disclosure has been described with reference to the embodiments illustrated in the attached drawing figures, equivalents may be employed and substitutions made herein without departing from the scope of the claims. Components illustrated and described herein are merely examples of a system/device and components that may be used to implement embodiments of the disclosure and may be replaced with other devices and components without departing from the scope of the claims. Furthermore, any dimensions, degrees, and/or numerical ranges provided herein are to be understood as non-limiting examples unless otherwise specified in the claims.

What is claimed:

1. An aircraft seat, the aircraft seat comprising:
an aircraft seat frame, the aircraft seat frame including one or more seatback frames and a seat pan frame; and
a self-supporting berthing platform system, the self-supporting berthing platform system comprising:
a plurality of articulated panels, the plurality of articulated panels including a first panel coupled to a second panel via at least one hinge assembly, the plurality of articulated panels configured to pivot between at least one of an upright position and a berth position via an articulated mechanism;
a hinge reinforcement assembly, the hinge reinforcement assembly including a first reinforcement member coupled to a portion of the first panel, the hinge reinforcement assembly further including a second reinforcement member coupled to a portion of the second panel, the hinge reinforcement assembly further including a flange coupled to an additional portion of the second panel, a portion of the first reinforcement member configured to overlap with a portion of the second reinforcement member;
a panel reinforcement assembly, the panel reinforcement assembly comprising:

a first panel reinforcement member coupled to a portion of the first panel and a portion of at least one of the one or more seatback frames; and a second panel reinforcement member sub-assembly coupled to a portion of the second panel, the second panel reinforcement member sub-assembly including at least one panel leg and at least one support block;

wherein the at least one support block includes a rotatable support block configured to rotate via a rotation sub-assembly;

wherein the rotation sub-assembly comprises:

a ball plunger; and a locking plate, the ball plunger configured to engage with one or more portions of the locking plate to secure the rotatable support block in at least one of a stowed position or a deployed position.

2. The aircraft seat of claim 1, wherein the at least one hinge assembly comprises:

a first leaf coupled to a portion of the first panel and a second leaf coupled to a portion of the second panel, the first leaf configured to mate with the second leaf.

3. The aircraft seat of claim 2, wherein the flange is coupled to a bottom surface of the second leaf and the second reinforcement member is coupled to a top surface of the second leaf.

4. The aircraft seat of claim 1, further comprising:

a panel frame sub-assembly including one or more framing members coupled to one or more edges of at least one the first panel or the second panel of the plurality of articulated panels.

5. The aircraft seat of claim 1, wherein the at least one panel leg includes a fixed panel leg.

6. The aircraft seat of claim 1, wherein the at least one panel leg includes at least one pivotable panel leg.

7. The aircraft seat of claim 1, wherein the articulated mechanism includes a spring-loaded gas spring.

8. The aircraft seat of claim 1, wherein the articulated mechanism includes a roller coupled to a portion of the one or more seatback frames.

9. A self-supporting berthing platform system, the self-supporting berthing platform system comprising:

a plurality of articulated panels, the plurality of articulated panels including a first panel coupled to a second panel via at least one hinge assembly, the plurality of articulated panels configured to pivot between at least one of an upright position and a berth position via an articulated mechanism;

a hinge reinforcement assembly, the hinge reinforcement assembly including a first reinforcement member coupled to a portion of the first panel, the hinge reinforcement assembly further including a second reinforcement member coupled to a portion of the second panel, the hinge reinforcement assembly further including a flange coupled to an additional portion of the second panel, a portion of the first reinforcement member configured to overlap with a portion of the second reinforcement member;

a panel reinforcement assembly, the panel reinforcement assembly comprising:

a first panel reinforcement member coupled to a portion of the first panel and a portion of at least one seatback frame of one or more seatback frames; and a second panel reinforcement member sub-assembly coupled to a portion of the second panel, the second panel reinforcement member sub-assembly includes at least one panel leg and at least one support block;

wherein the at least one support block includes a rotatable support block configured to rotate via a rotation sub-assembly;

wherein the rotation sub-assembly comprises:

a ball plunger; and a locking plate, the ball plunger configured to engage with one or more portions of the locking plate to secure the rotatable support block in at least one of a stowed position or a deployed position.

\* \* \* \* \*